Patented Aug. 25, 1931

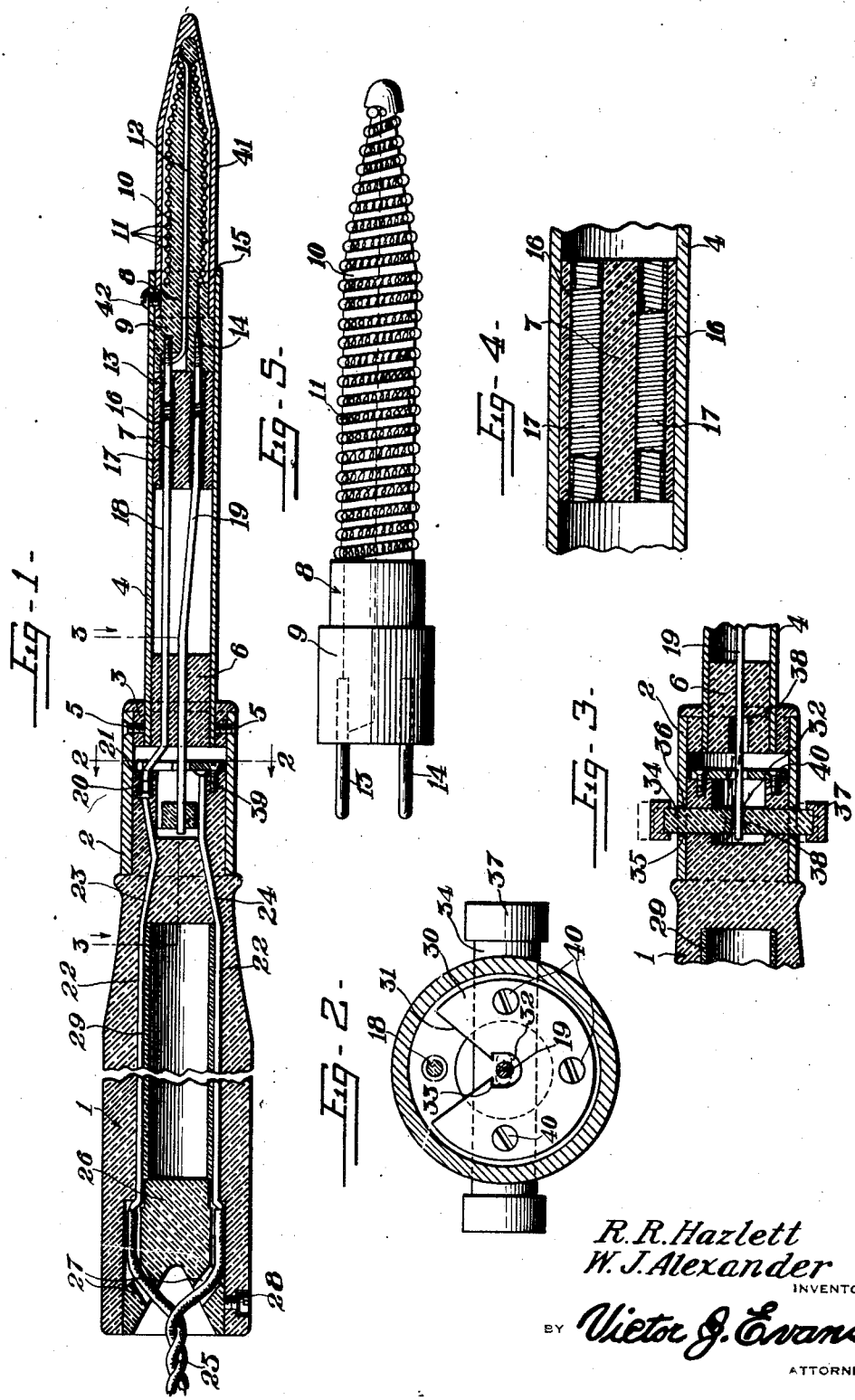

1,820,799

UNITED STATES PATENT OFFICE

RAYMOND R. HAZLETT AND WILLIAM J. ALEXANDER, OF LINDEN, NEW JERSEY

ELECTRIC SOLDERING IRON

Application filed July 26, 1930. Serial No. 471,015.

This invention relates to improvements in soldering irons and more particularly to an improved electric iron and the invention has as its primary object to provide a soldering iron which will be heated almost instantaneously, through the closing of an electric circuit and which will consume current only when actually in use, and, in this connection the invention also has as one of its objects to provide a soldering iron so constructed that the heat generated by the electric resistance heating unit thereof, will be accumulated and conserved so that the iron may be employed for soldering purposes as long as five minutes after the current has been cut off from the source of supply.

Another object of the invention is to provide an electric soldering iron embodying a novel switch or circuit closer so constructed and functioning in such a manner as to greatly economize in the space ordinarily required for housing an electric unit of this type, the switch being so constructed that it may be actuated, to close the circuit, either by thumb pressure against either end of a shiftable bar, or the mere disposal of a soldering iron, with light pressure, upon a table or other convenient support, and in this connection, the invention contemplates an economy in the construction and operation of the switch inasmuch as it contemplates the utilization, as one conductor, associated with the switch, a resilient wire, which will be deflected, against its resiliency, when the member is shifted. This resilient conductor serves to return the member to normal position when the member is relieved of pressure.

Another object of the invention is to provide a soldering iron of the type referred to in which novel means will be provided for connecting the electric conductors throughout the several component sections of the device so long as the parts are held in their assembled relations.

This invention also consists in certain other features of construction and in the combination and arrangement of the several parts, to be hereinafter fully described, illustrated in the accompanying drawings, and specifically pointed out in the appended claims, it being understood of course that minor changes may be made so long as they fall within the scope of the claims.

In describing my invention in detail, reference will be had to the accompanying drawings, wherein like characters denote like or corresponding parts throughout the several views, and in which:

Figure 1 is a vertical longitudinal sectional view through a soldering iron constructed in accordance with the present invention.

Figure 2 is a detail vertical transverse sectional view taken substantially on the line 2—2 of Figure 1, looking in the direction indicated by the arrows.

Figure 3 is a sectional view at right angles to Figure 1 taken substantially on the line 3—3 of Figure 1, looking in the direction indicated by the arrows.

Figure 4 is a detail sectional view illustrating one plug of the electric iron embodying the invention and which plug embodies means for the anchorage of electric conductors.

Figure 5 is a view in elevation of the electrical resistance unit of the device removed from the other parts.

The electric iron embodying the invention includes a handle indicated in general by the numeral 1, which handle may be of wood or any other suitable insulating material and the numeral 2 indicates a cylindrical ferrule which is fitted to the forward end of the handle. A bushing 3 of any suitable insulating material is arranged within the outer end of the ferrule 2 and a tubular cylindrical shank 4 is fitted at one end into the bushing and the bushing and shank are held together and fixed with respect to the ferrule 2 by means of set screws 5 which are threaded through registering openings in the ferrule and bushing, the screws being tightened to bind against the hollow tubular shank. A plug 6 of any suitable insulating material, such for example as porcelain or hard rubber, is arranged within the inner end of the shank 4 and a plug 7, also of insulating material, is fitted into the outer end portion of the tubular shank.

The electric resistance unit of the soldering iron is indicated by the numeral 8, in general, and the same comprises a plug-like head 9 which is fitted into the outer end of the tubular shank 4 and, at its inner end, abuts against the plug 7.

A stem 10 extends centrally from the outer end of the head 9 and this stem is preferably helically grooved, in a shallow manner, so as to accommodate a coil 11, which coil is of electrical resistance wire, and is wound about the stem and connected with a central lead thereof, indicated by the numeral 12, which lead extends axially through the stem 10 and head 8 and is connected to a contact 13, preferably in the nature of a pin of cylindrical form which is threaded or embedded in the head 9 of the resistance unit. A similar pin 14 is also embedded in the head 9 of the resistance unit and to this latter pin there is electrically connected the lead 15 from the other end of the resistance coil 11, the pins 13 and 14 projecting, at their free ends, slightly beyond the inner end of the head 9. The plug 7 is formed with a pair of longitudinal bores 16 in each of which is fitted a helical wire spring sleeve 17, one end of each of these sleeves being adapted to accommodate the said free end of the pin 13 and the other, the free end of the pin 14. In a manner to be presently described, the heating unit 8 is removably held in place in the outer end of the tubular shank 4 and in order that current may be supplied to the terminals of the resistance coil of this unit, through the medium of the contact pins 13 and 14, conductors 18 and 19 are embedded, intermediate their ends, in the plug 6 as shown in Figure 1 and, for a purpose to be presently explained, the conductor 19 will preferably be of resilient wire and the forward ends of the conductors 18 and 19 are fitted into the other ends of the wire spring sleeves 17 and, the conductor 19 is preferably led, from the plug 7 to the plug 6, at a slight angle so as to extend through the plug 6 in axial alinement with said plug. A socket 20 is formed in the handle 1 at the forward end of said handle and a helical spring sleeve 21 is arranged within this socket and the rear end of the conductor 18 is fitted in one end of this sleeve.

Grooves 22 are formed longitudinally in the bore of the handle 1 and conductors 23 and 24, corresponding in their location, with respect to the axes of the soldering iron as a whole, to the conductors 18 and 19 and the forward end of the conductor 23 is led into the sleeve 21 and is in contact with the end of the conductor 18. The conductors 23 are brought together and preferably twisted as at 25 to form a cable which may be connected with any suitable source of current supply, and preferably a plug 26 of insulating material is fitted in the outer end of the bore of the handle 1 and has openings 27 therein through which the conductors 22 are led, at their insulated length portions, this plug 26 being removably held in place by a set screw 28. A sleeve 29 of insulating material is arranged within the bore of the handle 1 between the plug 26 and the closed inner end of the bore and this sleeve defines an insulating chamber or compartment in which a spare one of the tips may be disposed and retained until required for use.

As stated above the conductor wire 19 is resilient in character and so led within the shank 4 as to extend axially through the plug 6 and this conductor constitutes, in effect, one element of a circuit closing device which will now be described. The circuit closing device referred to comprises a disk 30 which may be of any appropriate metal and which is of circular form except that it is provided with a V-shaped recess 31 at one side and a centrally located opening 32 with which the minor end of the recess communicates the wall of the opening 32 being formed, at this point of communiation of the recess and opening, with shoulders 33.

It will be observed, by reference to Figures 1, 2 and 3 of the drawings that the portion of the conductor 19 which extends rearwardly of the plug 8, extends also through the opening 32 but that it is spaced with respect to the wall of said opening. However, the invention contemplates the provision of means for utilizing this conductor terminal as one element of the circuit closer and, with this end in view, a rod 34 of insulating material is mounted for diametric shifting movement in registering openings 35 and 36 formed in the handle 1 and ferrule 2, respectively, and is preferably provided at its ends, with caps 37 which may be of hard rubber, metal, or any other material found suitable for the purpose. By reference to Figure 3 of the drawings, which is, as previously stated, a section on the line 3—3 of Figure 1, taken in a plane substantially at right angles to the plane in Figure 1, the conductor 19 is, due to its resiliency, capable of being flexed and preferably the plug 6 has its opening, through which this conductor extends, increased in diameter at its rear end as indicated by the numeral 38, so as to permit of limited flexing movement of the rear end of the conductor. In order that this movement may be effected, the rod 34 is formed with an opening 38 preferably flared in the direction of its two ends, and the rear extremity of the conductor 19 engages in this opening.

Normally the conductor will be straight or in other words have a right line extent coincident with the axis of the plug 6, but it will be evident by reference to Figures 1 to 3 inclusive that, in the event the rod 34 is shifted in one direction or the other, the conductor 19 will have its rear end portion flexed so as to be brought into engagement with the wall of the opening 32 and, inasmuch as the line conductor 24 is spot welded, as at 39, to the disk 30, and the disk is held against rotation by screws 40 which are fitted through openings therein and threaded into the inner end of the handle 1, transverse shifting of the bar in either direction will cause a flexing of the resilient flexible terminal of the conductor 19 and engagement of the conductor with one or the other side wall of the opening 32.

From the foregoing description it will be evident that by forming the recess 31 in the plate 30, the plate is prevented from coming in contact with the conductor 18 and likewise the conductor is prevented from coming in contact with the plate and, by forming the shoulders 33 at the juncture of the opening 32 and recess 31, the conductor 19 is prevented from leaving the opening.

It will also be evident from the foregoing that pressure against either of the heads 37 of the rods 34 will effect closing of the circuit through the electric heating unit.

In order that the heating unit may be protected and the soldering iron be provided with a smooth tip for contact with the part or parts to be soldered, a metallic tip 41 is provided and this tip is shaped to correspond to the contour of the said heating unit and of interior dimensions to be spaced from the resistance coil 11 of said unit. The tip is fitted into the outer end of the tubular shank 4, and a set screw 42 is threaded through registering openings in the tip and shank and bears against the head 9 of the heating unit 8.

What we claim is:

1. In an electric soldering iron, a handle of insulating material, a ferrule fitted to the forward end of the handle, a tubular shank extending forwardly from the ferrule, a hollow metal soldering tip separably connected with the forward end of the shank, an electrical resistance heating unit within the tip, plugs of insulating material within the ends of the tubular shank, electrical conductors supported at their end portions in the plugs and in circuit with the said heating unit, conductor wires extending in the handle and one having its terminal in circuit with one of the said conductors, the other conductor being resilient, and a circuit closing unit comprising a contact disk to which the other one of the conductor wires is connected, the disk having an opening therein, the said resilient conductor extending through said opening and normally out of contact with the wall thereof, and a rod of insulating material shiftably mounted in the handle and inwardly of the contact disk and having an opening into which the free end of the resilient conductor extends, whereby shifting of the rod will effect engagement of the said end of the resilient conductor with the wall of the opening in the contact disk to close the circuit through the heating unit.

2. In an electric soldering iron, a handle of insulating material, a ferrule fitted to the forward end of the handle, a tubular shank extending forwardly from the ferrule, a hollow metal soldering tip separably connected with the forward end of the shank, an electrical resistance heating unit within the tip, plugs of insulating material within the ends of the tubular shank, electrical conductors supported at their end portions in the plugs and in circuit with the said heating unit, conductor wires extending in the handle and one having its terminal in circuit with one of the said conductors, the other conductor being resilient, and a circuit closing unit comprising a contact disk to which the other one of the conductor wires is connected, the disk having an opening therein, the said resilient conductor extending through said opening and normally out of contact with the wall thereof, and a rod of insulating material shiftably mounted in the handle and inwardly of the contact disk and having an opening into which the free end of the resilient conductor extends, whereby shifting of the rod will effect engagement of the said end of the resilient conductor with the wall of the opening in the contact disk to close the circuit through the heating unit, the said resilient conductor also constituting means for shifting the rod to normal position when the rod is relieved of pressure.

3. In an electric soldering iron, a handle of insulating material, a ferrule fitted to the forward end of the handle, a tubular shank extending forwardly from the ferrule, a hollow metal soldering tip separably connected with the forward end of the shank, an electrical resistance heating unit within the tip, plugs of insulating material within the ends of the tubular shank, electrical conductors supported at their end portions in the plugs and in circuit with the said heating unit, conductor wires extending in the handle and one having its terminal in circuit with one of the said conductors, the other conductor being resilient, and a circuit closing unit comprising a contact disk to which the other one of the conductor wires is connected, the disk having an opening therein, the said resilient conductor extending through said opening and normally out of contact with the wall thereof, and a rod of insulating material shiftably mounted in the handle and inwardly of the contact disk and having an opening into which the free end of the resilient conductor extends, whereby shifting of the rod will effect engagement of the said end of the resilient conductor with the wall of the opening in the contact disk to close the circuit through the heating unit, the said resilient conductor also constituting means for shifting the rod to normal position when the rod is relieved of pressure, the said contact disk also having a recess communicating with the opening to clear the other conductor.

4. In an electric soldering iron, a handle of insulating material, a ferrule fitted to the forward end of the handle, a tubular shank extending forwardly from the ferrule, a hollow metal soldering tip separably connected with the forward end of the shank, an electrical resistance heating unit within the tip, plugs of insulating material within the ends of the tubular shank, electrical conductors supported at their end portions in the plugs and in circuit with the said heating unit, conductor wires extending in the handle and one having its terminal in circuit with one of the said conductors, the other conductor being resilient, and a circuit closing unit comprising a contact disk to which the other one of the conductor wires is connected, the disk having an opening therein, the said resilient conductor extending through said opening and normally out of contact with the wall thereof, and a rod of insulating material shiftably mounted in the handle and inwardly of the contact disk and having an opening into which the free end of the resilient conductor extends, whereby shifting of the rod will effect engagement of the said end of the resilient conductor with the wall of the opening in the contact disk to close the circuit through the heating unit, the said resilient conductor also constituting means for shifting the rod to normal position when the rod is relieved of pressure, the said contact disk also having a recess communicating with the opening to clear the other conductor, the said opening being restricted at its side with which the recess is in communication.

5. In an electric soldering iron, a handle of insulating material, a ferrule fitted to the forward end of the handle, a tubular shank extending forwardly from the ferrule, a hollow metal soldering tip separably connected with the forward end of the shank, an electrical resistance heating unit within the tip, plugs of insulating material within the ends of the tubular shank, electrical conductors supported at their end portions in the plugs and in circuit with the said heating unit, conductor wires extending in the handle and one having its terminal in circuit with one of the said conductors, the other conductor being resilient, the said plugs having spaced bores therein, and helical spring sleeves within the bores and accommodating the terminals of the respective conductors, and a circuit closing unit comprising a contact disk to which the other one of the conductor wires is connected, the disk having an opening therein, the said resilient conductor extending through said opening and normally out of contact with the wall thereof, and a rod of insulating material shiftably mounted in the handle and inwardly of the contact disk and having an opening into which the free end of the resilient conductor extends, whereby shifting of the rod will effect engagement of the said end of the resilient conductor with the wall of the opening in the contact disk to close the circuit through the heating unit.

In testimony whereof we affix our signatures.

RAYMOND R. HAZLETT.
WILLIAM J. ALEXANDER.